United States Patent Office 2,755,277
Patented July 17, 1956

2,755,277
SAPOGENIN ISOMERIZING PROCESS

Albert Wettstein and Hans Kaegi, Basel, Switzerland, assignors to Ciba Pharmaceutical Products, Inc., Summit, N. J.

No Drawing. Application December 7, 1953,
Serial No. 396,722

Claims priority, application Switzerland
December 15, 1952

2 Claims. (Cl. 260—239.55)

This invention relates to a process for the isomerization of compounds of the spirostane series, such as steroidal sapogenins, for example sarsasapogenin, as a result of which pseudosapogenins (furostene series) are produced.

It is known to effect isomerization of steroidal sapogenins by heating them with acetic or propionic anhydride in a closed vessel to about 200° C. Working under high pressure in this manner is of great disadvantage, especially on a manufacturing scale. It has also been shown that it is not possible to carry out this reaction in a pressure vessel made of iron. It is further known to effect the isomerization of steroidal sapogenins by heating them, for example with butyric anhydride under reflux, that is to say at a temperature of about 200° C. Working with butyric anhydride has, however, various disadvantages, so that for this isomerization the process using acetic anhydride in a pressure vessel has been preferred.

Contrary to expectations, it has now been found that compounds of the spirostane series can be isomerized so as to produce pseudosapogenins, by heating with propionic anhydride under atmospheric pressure. The reaction is advantageously carried out at a temperature in the neighborhood of the boiling point of the reaction mixture, as for example under reflux. In this operation it is preferable to distill off the propionic acid formed, either in a continuous manner or from time to time.

As starting materials spirostanes of any steric configuration can be used, that is to say normal or isospirostanes of the normal or allo-steroid series, which are saturated or unsaturated in the cyclopentanopolyhydrophenanthrene ring and may also contain any substituent, for example free or functionally converted hydroxyl or oxo-groups in 3-, 11- or 12-position, such as sarsasapogenin, diosgenin, tigogenin, $\Delta^4$-tigogenone, 11-ketotogogenin, smilagenin, hecogenin, rockogenin, botogenin and manogenin and their derivatives.

The following examples illustrate the invention, the relation between parts by weight and parts by volume being the same as that between the gram and the cubic centimeter:

Example 1

0.457 part by weight of diosgenin is dissolved in 2.25 parts by volume of propionic anhydride and the solution heated to boiling under reflux for 24 hours. The propionic acid produced is slowly distilled off up to 160° C. (about 0.4 part by volume), using a fractionating column, and the residue boiled for a further 24 hours. After subsequent distilling off of the residual propionic anhydride under vacuum, there remains a brown oil, which solidifies only slowly and constitutes practically pure pseudodiosgenin dipropionate. When recrystallized from methanol it melts at 79–80° C.

Example 2

10 parts by weight of hecogenin are reacted in a similar manner to that described in Example 1, with 50 parts by volume of propionic anhydride. The yellow oil remaining after distilling off the anhydride then crystallizes. By recrystallization from methanol or hexane, there are obtained therefrom at least 8 parts by weight of pseudohecogenin dipropionate of melting point 99–100.5° C.

Example 3

10 parts by weight of 11-ketotigogenin, when reacted in a similar manner to that described in Example 1, with 50 parts by volume of propionic anhydride, yield, likewise in very good yield, the 11-keto-pseudo-tigogenin dipropionate, which, when recrystallized from methanol, melts at 108–109° C.

What is claimed is:

1. A process for the conversion of sapogenin compounds into pseudosapogenin compounds which consists of heating a member of the group consisting of steroidal sapogenins and their corresponding acetates and propionates with propionic anhydride under atmospheric pressure and in the absence of a catalyst, the reaction temperature being in the neighborhood of the boiling point of the reaction mixture, distilling off the propionic acid formed during the isomerization and heating the remaining mixture under reflux until the 26-propionate of the pseudo-sapogenin is obtained.

2. A process for the conversion of sapogenin compounds into pseudosapogenin compounds which consists of heating a member of the group consisting of diosgenin, hecogenin and 11-keto-tigogenin and their corresponding acetates and propionates with propionic anhydride under atmospheric pressure and in the absence of a catalyst, the reaction temperature being in the neighborhood of the boiling point of the reaction mixture, distilling off the propionic acid formed during the isomerization and heating the remaining mixture under reflux until the 26-propionate of the pseudo-form is obtained.

References Cited in the file of this patent

UNITED STATES PATENTS

| | | |
|---|---|---|
| 2,352,852 | Marker | July 4, 1944 |
| 2,632,008 | Gould | Mar. 17, 1953 |